US006713142B1

(12) United States Patent
Arway et al.

(10) Patent No.: US 6,713,142 B1
(45) Date of Patent: Mar. 30, 2004

(54) SAMPLING KIT FORM

(75) Inventors: Lawrence W. Arway, Dayton, OH (US); Chris C. Rowton, Ft. Worth, TX (US); Kurt A. Brockman, Lake Zurich, IL (US)

(73) Assignee: The Standard Register Company, Dayton, OH (US)

( * ) Notice: Subject to any disclaimer, the term of this patent is extended or adjusted under 35 U.S.C. 154(b) by 77 days.

(21) Appl. No.: 09/997,111

(22) Filed: Nov. 29, 2001

Related U.S. Application Data

(60) Provisional application No. 60/250,343, filed on Nov. 30, 2000.

(51) Int. Cl.$^{7}$ .................................................. B32B 3/00

(52) U.S. Cl. ...................... 428/40.1; 206/460; 206/569; 206/778; 283/81; 428/41.8; 428/42.1; 428/42.2; 428/43; 428/121; 428/138; 428/202

(58) Field of Search ............................... 428/40.1, 41.8, 428/42.1, 42.2, 43, 192, 121, 138, 202; 283/81; 206/569, 460, 778

(56) References Cited

U.S. PATENT DOCUMENTS 5,582,298 A 12/1996 Clayton et al.
5,752,722 A 5/1998 Moore et al.

*Primary Examiner*—Nasser Ahmad
(74) *Attorney, Agent, or Firm*—Dinsmore & Shohl LLP

(57) ABSTRACT

A sampling kit form for storage and shipping of organic material. The form includes first and second coextensively joined plies, with adhesive and release coating placed at select locations therebetween such that the form surfaces are substantially free of lateral or longitudinal undulations, which allows the forms to be stacked without leaning or sagging. The first ply also includes a die cut that circumscribes a removable inset portion. Upon removal of the inset portion, adhesive disposed on an inner surface of the second ply is exposed, thus permitting the organic material, such as hair samples, to be placed on the exposed adhesive coating. Fold lines in the sheet establish preferential folding locations so that the organic material samples can be encased between layers of adhesive and release coating within the form once it is folded. The form also includes a postcard that can be detached along a perforated line of weakness. The form outer surfaces bear instructional indicia that can be added either prior to or after form assembly.

22 Claims, 6 Drawing Sheets

SAMPLING KIT FORM

This application claims the benefit of U.S. Provisional Application No. 60/250,343 filed Nov. 30, 2000.

BACKGROUND OF THE INVENTION

The present invention is directed generally to a business form and, more particularly to a form for use in collecting sample material, such as organic sample material, and forwarding it to a laboratory for analysis.

Analysis of the organic matter is often conducted at locations remote from the sampling site. By way of example, techniques used to track the lineage of purebred animals involve obtaining hair or blood samples from an animal, then mailing the samples to a laboratory for DNA analysis. In a conventional sampling approach, the sample is packed in a vial labelled with salient information about the sample. The vials, however, tended to be fragile and bulky, thus making them susceptible to being damaged in transit, thereby subjecting the samples to contamination. The advent of accurate DNA analysis on hair samples has made possible alternative methods of packaging and shipping such samples. For example, U.S. Pat. No. 5,582,298 (hereinafter the '298 patent), issued to Clayton, teaches sampling kit forms for hair samples that alleviate the shortcomings of the conventional vial-based approach. The business form of the '298 patent includes a sampling kit having a foldable sheet substrate with die cut openings and a transparent cover over the opening, and an adhesive area on the sheet adjacent the opening. A removable release liner covers the layer of adhesive, while a line of weakening located in the sheet extends through the adhesive area in the general direction of the opening. The material to be sampled may be adhered to the adhesive area after removal of the release liner so that the material extends over the opening. The sheet is then folded upon itself on the line of weakening and held folded in this position by the adhesive.

While the kit of the '298 patent functions well, the varying thickness across the form width hampers its use in some printers. For example, when multiple forms are superimposed one on top of another for cut-sheet applications, such as those where individual forms are loaded into a cut-sheet printer tray or cartridge (as found on a conventional desktop printer), the greater thickness of the portions with adhesive and overlaid labels produces an uneven, or leaning, stack. This can limit the number of forms stackable into the printer cartridge, thereby reducing the effectiveness of an otherwise automated process. Similar difficulties exist for printers that accept continuous web sheets, such as Z-fold webs or continuous rolls, examples of which include impact dot matrix, train, band and daisy wheel printers, as well as non-impact continuous laser printers and thermal transfer printers. The increased volume and decreased symmetry also make handling and transporting large quantities of the forms more cumbersome. Additionally, the inclusion of transparent windows leads to relatively complex construction of the kit, increasing manufacturing costs.

Accordingly, there is a need for a sampling kit form for collecting samples of organic matter in which the form may be simply manufactured, and in which the form may be printed with various types of printers.

SUMMARY OF THE INVENTION

These needs are met by the sampling kit form of the present invention, which is directed to a kit for collecting sample material, such as organic sample material. The kit containing the organic sample material can be conveniently handled and conveyed to a laboratory for analysis. According to one aspect of the present invention, a sampling kit form for organic material is disclosed. The sampling kit form is made up of a sheet that can accept printed indicia on one or both of its surfaces. The sheet in turn is made up of a first ply, a second ply, an adhesive and a release coating. Both the adhesive and the release coating are disposed between the inner surfaces of the first and second plies. One or more fold lines are disposed between opposing edges of the sheet. The first ply is defined by a first ply outer surface, a first ply inner surface and a die cut defining a coplanar removable inset portion. The second ply is stackably coupled to the first ply such that corresponding edges of the first and second plies are substantially aligned. As used in conjunction with the present disclosure, the term "substantially" refers to an arrangement of elements or features that, while in theory would be expected to exhibit exact correspondence or behavior, may, in practice embody something slightly less than exact. The second ply is defined by outer and inner surfaces, the latter of which faces the first ply inner surface. Upon removal of the inset portion, at least a portion of the second ply inner surface is exposed to accept the organic material thereon. After adhesively placing the organic material on part of the exposed second ply inner surface, the sheet can be folded along the one or more fold lines to protect the organic material within.

Optionally, the sampling kit form may be adapted to be suitable as a mailer intermediate. In this arrangement, each ply preferably has perforation lines (such as lines of weakness) that define marginal tear strips disposed around the form's periphery. The sampling kit form may also include die cuts around at least a portion of the periphery of the first and second plies. These die cuts define liner pieces that can be removed to expose adhesive disposed underneath. Upon removal of these liner pieces, the form may be folded, then sealed with the exposed adhesive. Once the mailed form is delivered, the recipient may tear away the marginal tear strips at their respective perforations to open the mailer.

Moreover, the first and second plies, as well as the adhesive and the release coatings, are disposed relative to one another such that a stacking surface defined by the sheet is substantially free of undulation, thereby improving the resistance of a stack of sheets to leaning. This is especially beneficial when fed into a conventional cut-sheet desktop printer. The sampling kit form can further include a line of weakness disposed between opposing edges of the sheet such that a detachable postcard connected to the sheet along the line of weakness is removable.

According to another aspect of the present invention, a sampling kit form for organic material is disclosed. The sampling kit form is made from a substantially rectangular sheet with opposing planar surfaces. The sheet includes a first ply, a second ply coextensively laminated to the first ply with an adhesive, one or more fold lines each disposed between opposing edges of the sheet, and a detachable postcard connected to one edge of the sheet along a line of weakness in one or both plies. A removable inset portion is defined by a die cut in the first ply so that when the inset portion is removed, at least a portion of the adhesive on the second ply is exposed such that the adhesive coating portion facilitates adhesion of the organic sample. The outer surface of the first and second plies are configured to accept printed indicia. Preferably, the organic material is hair, such as human or animal hair, and is placed on the second ply inner surface such that the roots of the hair do not contact any of the adhesive, thus preventing. contaminants that may be present in the adhesive from tainting the hair sample. The placement of the adhesive and release coating, as well as the configuration of the two plies, promotes a substantially uniform thickness across a significant portion of the sheet. This avoids leaning problems when numerous sheets are stacked, such as when preparing the stack for printing or shipping. As used in the present context, the term “significant” implies that enough of the form surface is sufficiently undulation-free, even though there are discrete sections where slight thickness variations may be present (most notably in the region defined by the inset portion), to prevent leaning stacks.

Optionally, the second ply inner surface of the sampling kit further comprises a release coating portion disposed across at least one of the fold lines from the adhesive coating portion. This allows the hair placed onto the adhesive coating portion to be protectively sandwiched between the adhesive and the release coating when the sheet is folded along that fold line. Furthermore, the sheet is configured to be folded along additional fold lines such that it can be repeatedly folded and fit into a storage container that has at least one dimension smaller than that of the unfolded sheet. Preferably, the printed indicia that can be placed on the outer surfaces of the sheet is instructional information, such as how to operate the kit form, mailing instructions or the like. The second ply inner surface can further comprise additional release coating portions. The first ply inner surface can further comprise an adhesive coating portion in removable contact with one of the additional release coating portions of the second ply inner surface to facilitate removal of the inset portion. Preferably, at least a portion of the first and second plies are permanently bonded to one another to produce the sheet, and that this portion extends around substantially the entire periphery of the sheet, at or near the sheet edges so that the sheet edges will not fray or otherwise separate. As with the previous aspect of the invention wherein the form is adapted to be a mailer intermediate, marginal tear strips may extend beyond the permanently bonded periphery of the sheet. Within these marginal tear strips, the two plies can have die cuts that define removable liner pieces. These die cuts define liner pieces that can be removed to expose adhesive disposed underneath. Upon removal of these liner pieces, the mailer intermediate may be folded, then sealed using the exposed adhesive. Once the mailer is delivered, the recipient may tear away the marginal tear strips at their respective perforations to open the mailer.

According to another aspect of the present invention, a sampling kit form for hair samples is disclosed. The sampling kit form is made up of a substantially rectangular sheet defining opposing planar surfaces. The sheet includes one or more fold lines each disposed between opposing lateral edges of the sheet, a first ply, a second ply and a detachable postcard connected by a line of weakness, such as perforations in the sheet. The first ply is defined by a first ply outer surface, a first ply inner surface, and a die cut substantially circumscribing a removable inset portion. The inner surface of the first ply has a release coating portion. The second ply is coextensively laminated to the first ply, and is defined by an outer surface and an inner surface, the latter of which includes both an adhesive coating portion and a release coating portion disposed thereon. Upon removal of the inset portion from the die cut, the hair sample may be adhered to the adhesive coating on the second ply. The release coating portion of the second ply is situated across at least one of the laterally extending fold lines from the adhesive coating portion such that, upon adhesion of the hair onto the adhesive coating portion and subsequent folding of the sheet along the fold line, the hair is securely contained within the sheet between the adhesive coating portion and the release coating portion of the second ply. Both the first and second ply outer surfaces are configured to accept printed indicia, such as that from a conventional desktop printer. The first ply and the second are disposed relative to one another such that a significant portion of a stacking surface defined by the outer surface of the first ply is substantially free of undulation, thereby promoting lean-free stacking.

According to yet another aspect of the present invention, a method of packaging an organic material sample is disclosed. The method includes configuring a sampling kit form to include a sheet that can accept printed indicia on at least one of its surfaces, removing an inset portion defined by a die cut from one of the plies making up the sheet to expose at least a portion of an adhesive that is situated between the sheet plies, placing an organic material sample on the exposed adhesive and folding the sheet along at least one fold line so that the sample is disposed between the adhesive and a release coating that is also situated between the sheet plies. The sheet includes a first ply with outer and inner surfaces and a die cut defining a removable inset portion, a second ply (also with outer and inner surfaces) stackably coupled to the first ply such that the corresponding edges of the two plies are substantially aligned and that the inner surfaces of the two plies face each other. Upon adhesive placement of the organic material on the second ply inner surface, the sheet can be folded along the fold line to protect the organic material within the folded sheet.

Optionally, the method includes the additional step of removing a detachably connected postcard from the sheet. In addition, instructional information can be printed on at least one of the sheet surfaces prior to removing the inset portion. Furthermore, a plurality of sheets can be stacked and placed in operative response to an automated printing device prior to removing the inset portion. The stack does not lean due to the relative lack of surface undulations and resultant generally planar stacking surface. Preferably, either a cut-sheet printer or a continuous-feed printer is used to perform the step of printing instructional information on the sheet. Examples of cut-sheet printers include desktop units, such as laser and ink-jet printers. Examples of continuous-feed printers include impact devices such as dot matrix, band, train and daisywheel printers, and non-impact devices such as laser or thermal transfer printers.

According to still another aspect of the present invention, a method of making an organic material sampling kit form is disclosed. The form is made from a multi-ply sheet that includes a first ply, a second ply coupled to the first ply such that corresponding edges of the first and second plies are substantially aligned, an adhesive disposed between at least a portion of the inner surfaces of the first and second plies, and a release coating disposed between at least a portion of the first and second ply inner surfaces. At least a portion of the adhesive between the plies is to facilitate adhesive contact between the second ply inner surface and the organic material. The method includes forming a sheet such that opposing planar surfaces of the sheet exhibit substantial uniformity of thickness along at least one of the sheet's lateral or longitudinal dimensions to establish substantially undulation-free construction across that dimension, forming a die cut in the first ply to define a removable inset portion therein such that, upon removal of the inset portion, at least a portion of the second ply inner surface and adhesive is exposed to accept a sample of organic material, and placing one or more fold lines between opposing edges of the sheet such that, upon placement of the organic material on the adhesive, the sheet can be folded along the one or more fold lines to protect the organic material within the folded sheet.

Optionally, an additional step includes placing printed indicia on at least one surface of the sheet. Such printed indicia can be placed on the sheet surface(s) by a conventional automated printing device. In addition, a plurality of sheets can be placed into the printer tray to form a stack therein, where the uniformity of thickness of the sheets prevents the stack from leaning. Moreover, the printer tray can accept either a continuous roll of the sheets, or individually cut sheets. Moreover, the one or more fold lines in the sheets may be perforate. As with the previous aspects of the invention, the two plies making up the form can have die cuts that define removable liner pieces. Similarly, each ply can also have perforation lines that define tear strips such that the form can be used as a mailer.

Other advantages and aspects of the present invention will become apparent upon reading the following description of the drawings in conjunction with the detailed description of the invention.

DETAILED DESCRIPTION OF THE PREFERRED EMBODIMENTS

Figure 1A:
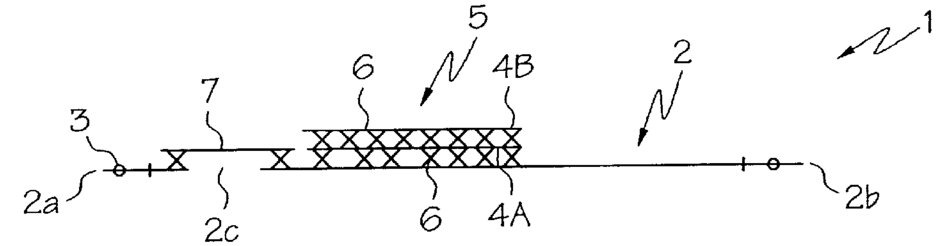
FIGS. 1A and 1B are edge-on views of an individual form and of a stack of forms, respectively, according to the prior art.
Figure 1B:
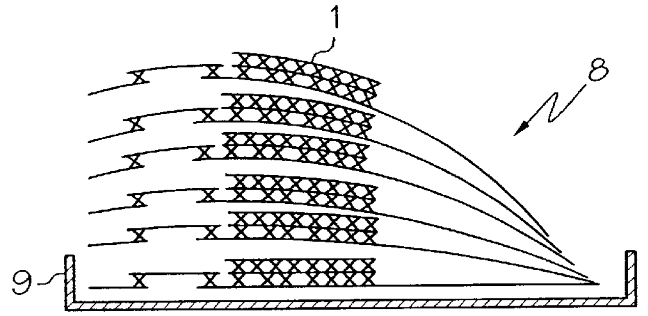

Referring first to FIGS. 1A and 1B, edge-on views of the sampling kit form 1 of the prior art is shown. A substrate 2 extends laterally from a left edge 2*a* to a right edge 2*b*, with a die-cut opening 2*c* disposed therein. A pinfeed margin 3 contains perforations so that, once fed through a printer tractor wheel (not shown), the pinfeed margin may be removed along longitudinal perforations. A series of labels 4A, 4B are stacked on top of substrate 2, held in place in an adhesive area 5 by adhesive 6. A transparent cover 7 is disposed over die-cut opening 2*c*, held in place by adhesive 6. Since the same number of layers do not extend substantially across the entire upper surface of form 1, the thickness of the form 1 varies along its lateral dimension, as shown in the figure. The problem associated with the varying thickness of form 1 is made manifest in FIG. 1B, where numerous sheets are arranged in a stack 8, such as would be encountered in a cut-sheet printer tray 9. To provide high form throughput and user-defined printed indicia placed thereon, it is often desirable to have the surfaces of the form 1 be blank. In such circumstances, automated or semi-automated feeding of numerous sheets into a printer (not shown) is preferred, so that large quantities of printed forms can be produced with a minimum amount of user input. However, the stack 8 of forms 1, being thicker on one side than the other, leans considerably. This leaning tendency limits the number of forms 1 that can be placed in tray 9, thus necessitating additional user oversight.

Figure 2A:
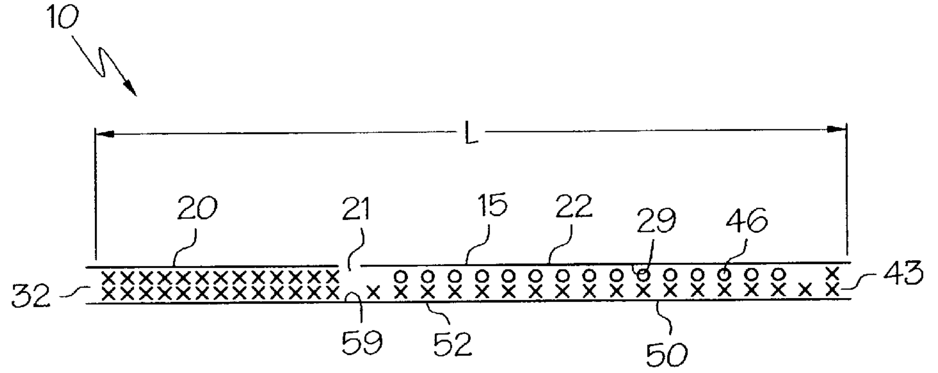
FIGS. 2A and 2B are edge-on views of an individual form and of a stack of forms, respectively, according to one aspect of the present invention.
Figure 2B:
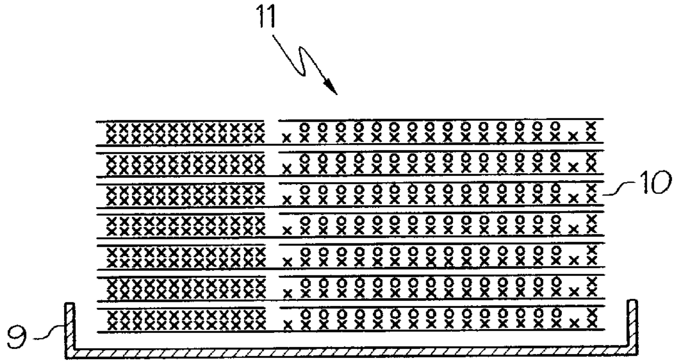

Referring now to FIGS. 2A and 2B, edge-on views of a sampling kit form according to an aspect of the present invention are shown. The form is a sheet 10 made up of a first ply 20 and a second ply 50. First ply 20 has an outer surface 22 and an inner surface 29, while second ply 50 includes an outer surface 52 and an inner surface 59. The two plies are coextensively laminated together during manufacture. As used in the present context, the term "coextensively" refers to an alignment of two or more plies of sheet-like substrate such that respective top, bottom, and longitudinal edges substantially align. Layers of pressure sensitive adhesive 43 and release coating 46 are disposed on various portions over the surface of each ply in such a way to ensure that the thickness of each sheet 10 is substantially uniform throughout a significant portion of its entire surface. A relatively undulation-free stacking surface 15 is made possible in part by this coextension of the first and second plies 20 and 50, respectively, as well as by the substantially uniform thickness of pressure sensitive adhesive 43 and release coating 46. By necessity, the stacking surface 15 extends along the substantial entirety of the longitudinal and lateral dimensions of the sheet 10, rather than merely a fraction thereof, so that a stack of such sheets does not lean. Discrete segments within sheet 10 can be created such that they are free of adhesive 43, release coating 46 or first ply 20 in order to define preferential form attributes, such as die cut 21 (discussed in more detail below), lift area (not presently shown) and unbonded ooze-free zone 32 around the form periphery. Additional discrete segments appear in the region (discussed in more detail below) where samples are to be placed. As shown with particularity in FIG. 2B, the sheets 10 can be placed in a stack 11 in a cut-sheet printer tray 9 without lean. This lack of side-to-side lean in the sheet 10 is also present in the longitudinal direction (not shown). This relative uniformity of the surface in both the longitudinal and lateral directions allows similar stacking results to be obtained when the forms are continuously fed from, for example, a Z-fold stack, which can be used in conjunction with a continuous-feed printer (not shown).

Referring now to FIGS. 3–6, plan views of the generally rectangular sheet 10 are shown. The sheet 10 includes aligned top, bottom and first and second longitudinal edges 12, 14, 16 and 18, respectively. First ply 20 is preferably a thin ply, such as densified kraft base paper liner that is super calendared to a thickness of approximately 2.5 mils. Such paper is available from Rhinelander Paper Company of Rhinelander, Wis. Die cut 21 is cut through first ply 20, and circumscribes an inset portion 21A that is adhesively coupled to second ply 50. Inset portion 21A can be removed along die cut 21 by grasping lift area 21B. The outer surface 22 preferably includes instructional information 28 on how to use the kit, including information related to removing the inset portion 21A, and where to adhere the sample (not presently shown). This instructional information 28 can either come preprinted prior to assembly of sheet 10, or by means of either impact or non-impact printers (not shown). The instructional information 28 also indicates both a point of detachment of a postcard 27 along a line of weakness 23, as well as a folding location along at least one of first, second, and third fold lines, 24, 25 and 26, respectively. Preferably, the line of weakness 23 and the fold lines 24, 25 and 26 are defined by perforation lines that extend completely through both plies 20 and 50. Additional instructional information 28 can include a preprinted address on the face of postcard 27. As shown with particularity in FIG. 5, the first ply inner surface 29 includes patterns of uncoated portions 47, pressure sensitive adhesive portions 43A, 43B and 43C, and silicone release coating portions 46A, and 46B. Adhesive portions 43A, 43B and 43C are all preferably the same pressure sensitive adhesive, and may be applied during manufacture from one printing plate, as can release coating portions 46A and 46B.

Figure 6:
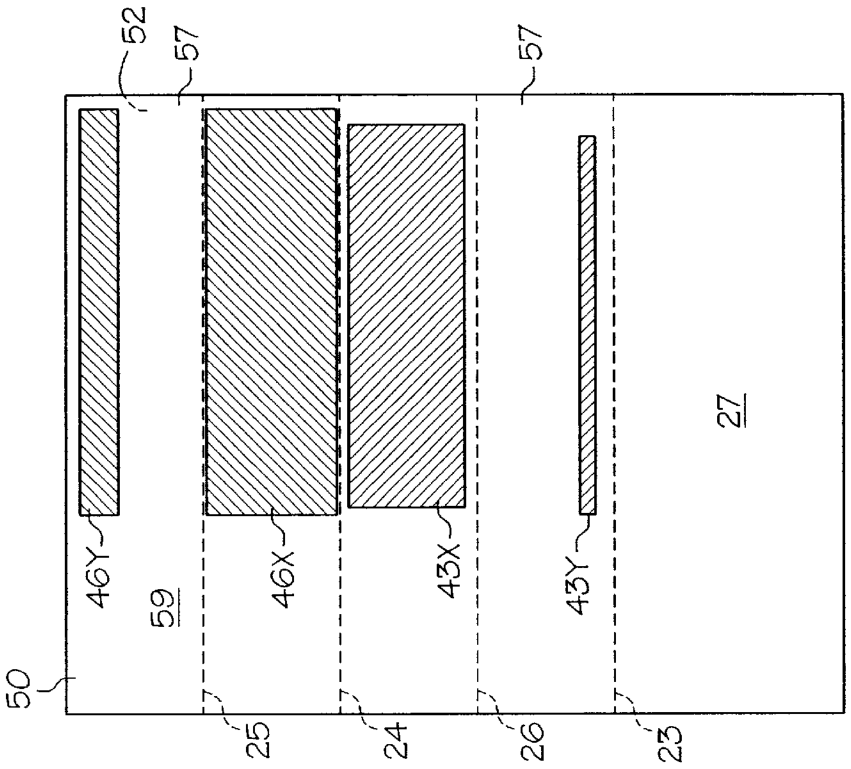
FIG. 6 is a plan view of the inner surface of the second ply of the sampling kit form of FIG. 3.
Figure 5:
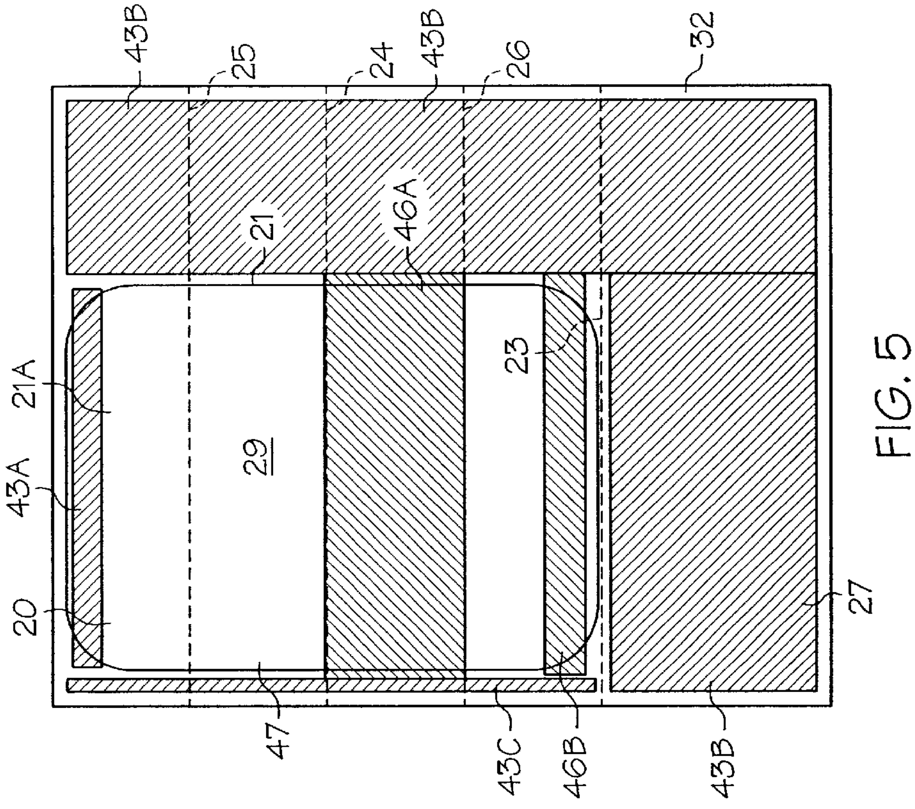
FIG. 5 is a plan view of the inner surface of the first ply of the sampling kit form of FIG. 3.

The second ply 50, shown with particularity in FIG. 6, has an outer surface 52 and an inner surface 59 on the opposing side. Second ply 50 is preferably a paper of sufficient thickness to meet postal specifications for post cards when combined with the thickness of first ply 20, yet thin enough for the combined plies to feed readily through a conventional laser printer. An acceptable material for the second ply 50 is a 32# ledger paper. Postal specifications require minimum overall postcard thickness to be 7.0 mils. These sheets may be either simplex printed or duplex printed. The outer surface 52 can include pre-printed indicia (not shown) similar to the pre-printed instructional information 28 on the outer surface 22 of first ply 20. As with the first ply 20, the second ply 50 can be either preprinted or blank, the latter to receive variable printing via impact or non-impact printers, with laser printers being most preferable. The inner surface 59 has uncoated portions 57, first and second pressure sensitive adhesive portions 43X and 43Y, respectively, and first and second release coating portions 46X and 46Y, respectively.

Figure 4:
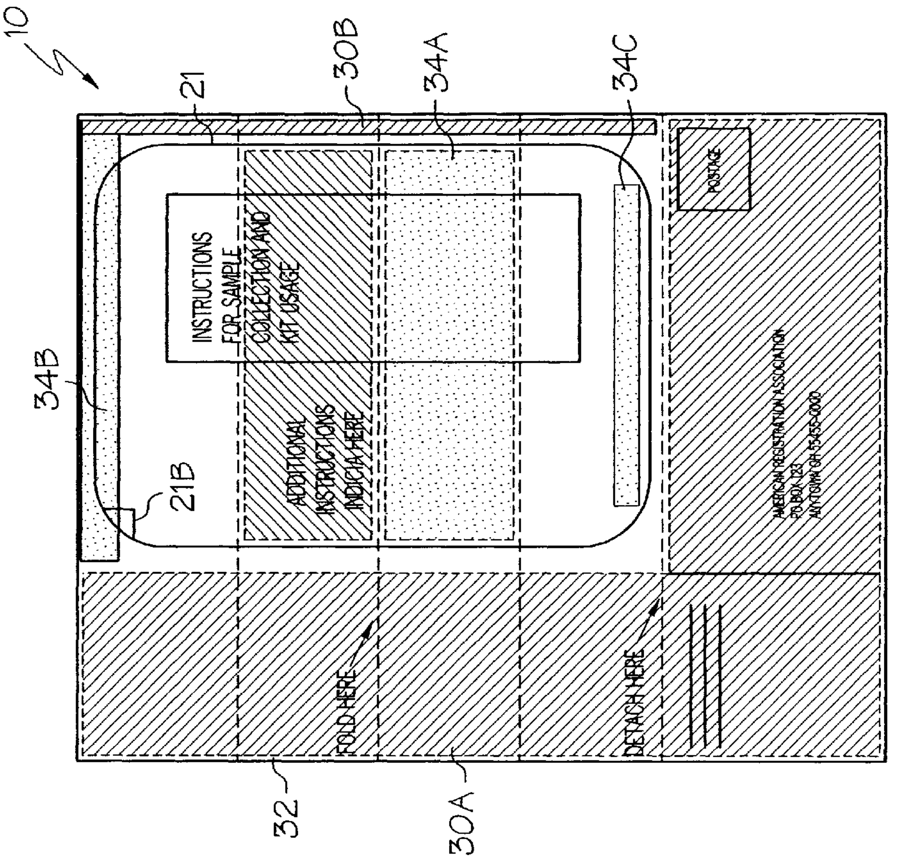
FIG. 4 is a diagrammatic plan view of the sampling kit form of FIG. 3, showing the arrangements of coatings and bonds.
Figure 3:
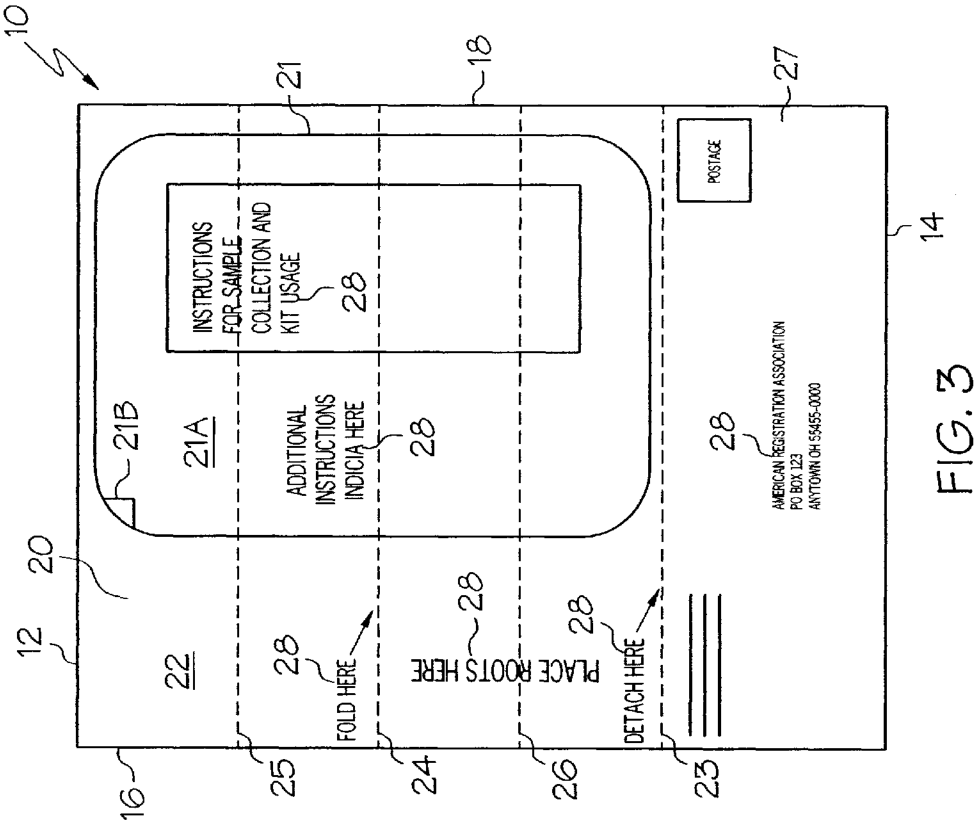
FIG. 3 is a plan view of the sampling kit form of the present invention, showing the first ply.

Referring with particularity to FIG. 4, sheet 10 includes form portions that are permanently bonded together, portions that are releasably bonded together, and portions that are not bonded. For example, permanent bond portions 30A and 30B define a significant portion of the periphery, as does a minute unbonded strip portion 32, the latter preferably located between the edge and the former to prevent the occurrence of potential adhesive spillover problems during lamination of the former. In the present context, a "permanent" bond is one between two adhesive layers, or an adhesive layer and a non-coated layer of paper such that an attempt to separate the joined layers will result in significant damage to either or both of the layers. In addition, first, second, and third releasable bond portions 34A, 34B and 34C, respectively, define regions that are intended to be accessed more than once. Releasable bond portions 34A and 34C are formed with adhesive portion 43X and 43Y located on second ply inner surface 59 and release coating portions 46A and 46B, respectively, located on first ply inner surface 29. Releasable bond portion 34B is formed from transverse adhesive strip 43A located on first ply inner surface 29 and second release coating portion 46Y located on second ply inner surface 59.

Figure 8:
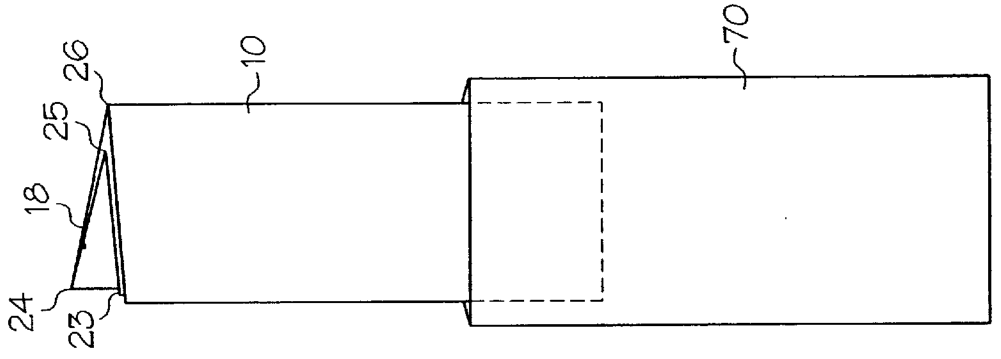
FIGS. 7 and 8 illustrate the manner of using sampling kit form of FIG. 3.
Figure 7:
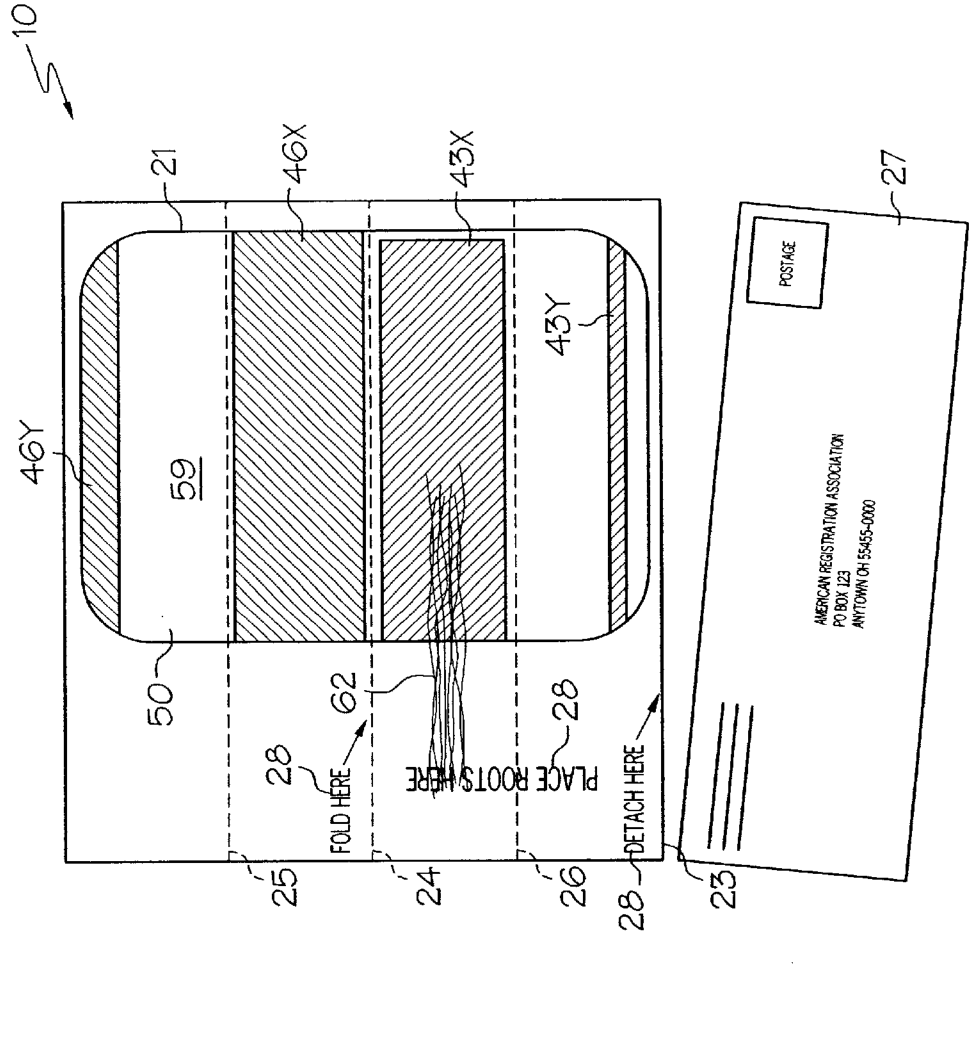

Referring now to FIGS. 7 and 8, use of the sheet 10 is shown. Inset portion 21A (not presently shown) is removed along die cut 21. The organic sample 62, preferably hair, is adhered to the first adhesive portion 43X of second ply 50 (shown partially exposed through die cut 21). It will be appreciated by those skilled in the art that while the various aspects of the present invention have tacitly incorporated animal hair as the genetic material, the scope of the invention is not so limited. For example, the present inventors have discovered that the present invention could be used with equal efficacy on human hair and related materials. Preferably, but not essentially, the roots of the hair in the sample 62 are placed outside the area defined by die cut 21 (yet still within the edges defined by sheet 10) to avoid contamination by the pressure sensitive adhesive 43X, 43Y present on portions of the inner surface 59 of second ply 50. The post card 27, which preferably includes a waiver or related information on the back (not shown), is removed along weakness 23 and signed, after which it can be mailed to an appropriate registration association identified on the front surface thereof. Once the post card 27 is detached, the upper portion of the sheet 10 may be folded first along fold line 24 so that first release coating portion 46X contacts first adhesive portion 43X and samples 62, while second release coating portion 46Y contacts second adhesive portion 43Y. Sheet 10 can then be folded along fold lines 25 and 26 to further encase sample 62. The now substantially V-shaped folded sheet 10, minus the post card 27, is then slipped into a plastic storage sleeve 70 similar to those commonly used in storing 35 mm film negatives. The folded portion stored in the plastic sleeve 70 creates a permanent record containing genetic materials unique to the particular sample. Due to the adhesive and release coating alignment of the two plies 20 and 50, the sheet 10 can be opened and closed as desired. The folded sheet 10 can then be inserted into a pre-addressed envelope (not shown) and mailed to a testing facility for subsequent analysis of sample 62.

Figure 10:
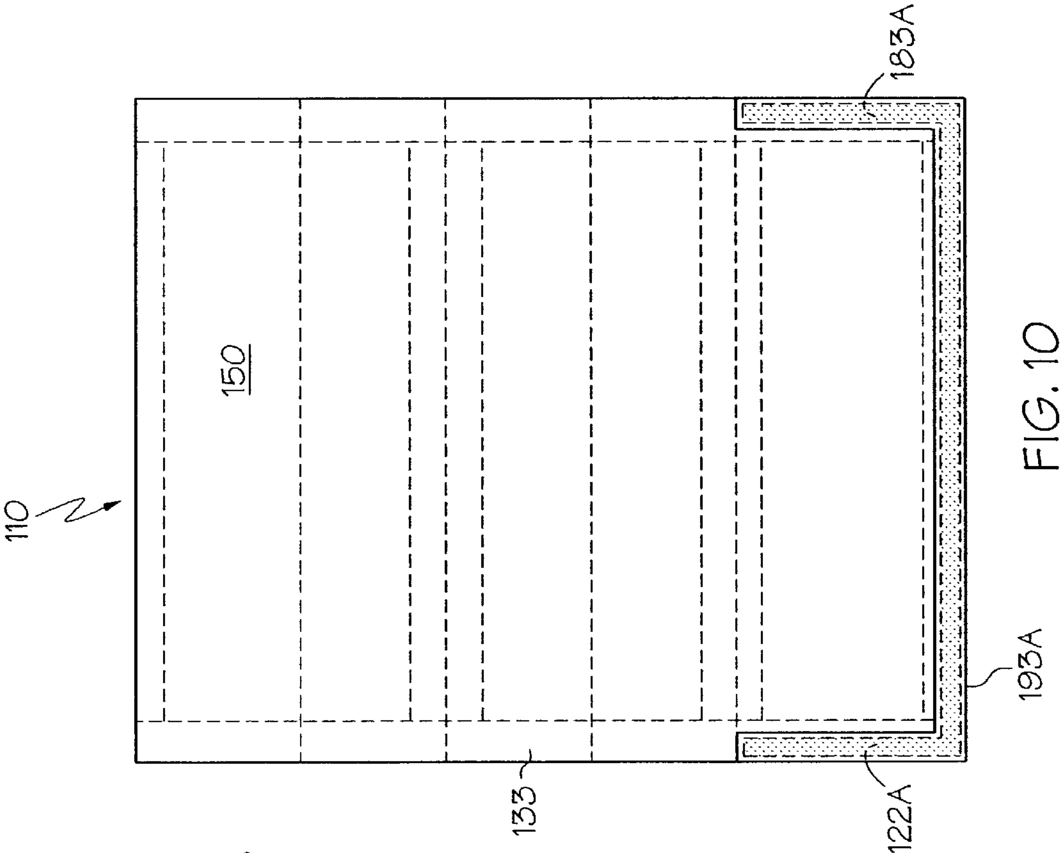
FIGS. 9 and 10 are plan views of the outer surfaces of first and second plies of a sampling kit form arranged to be folded in a Z-fold manner.
Figure 9:
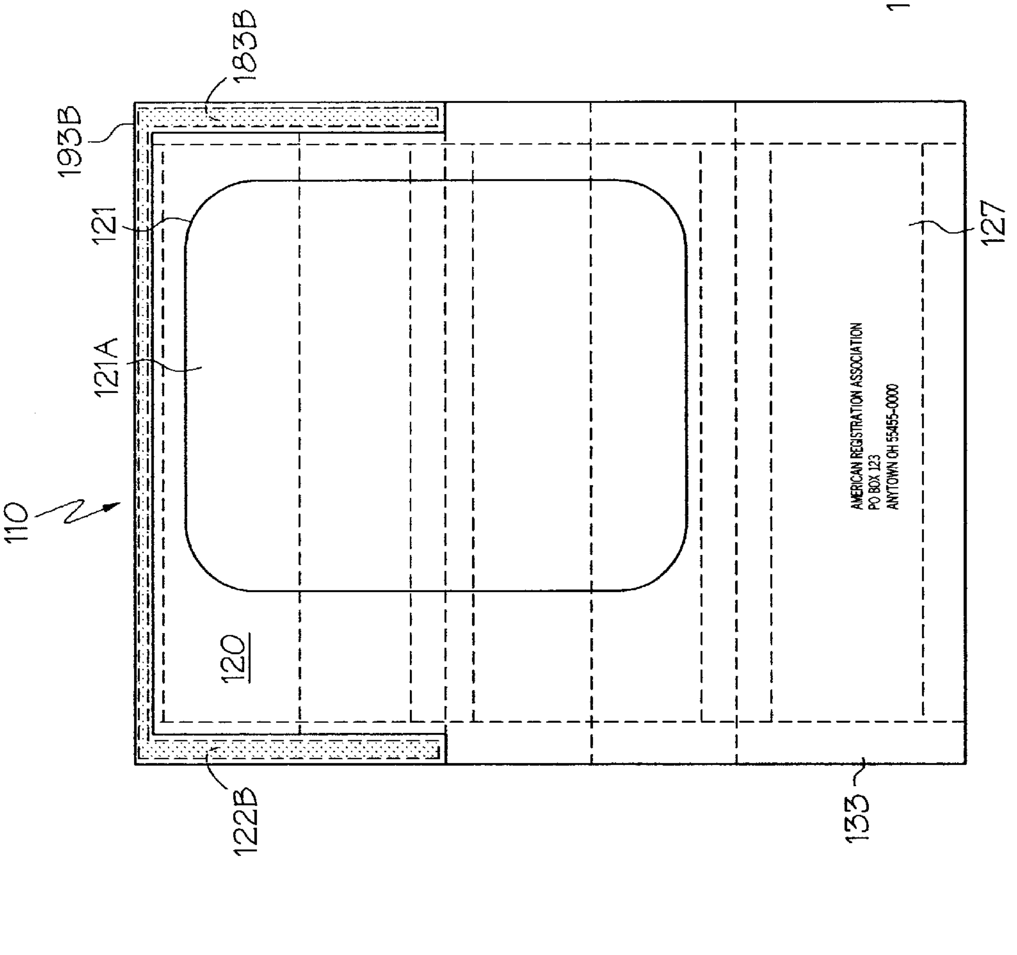
Figure 11:
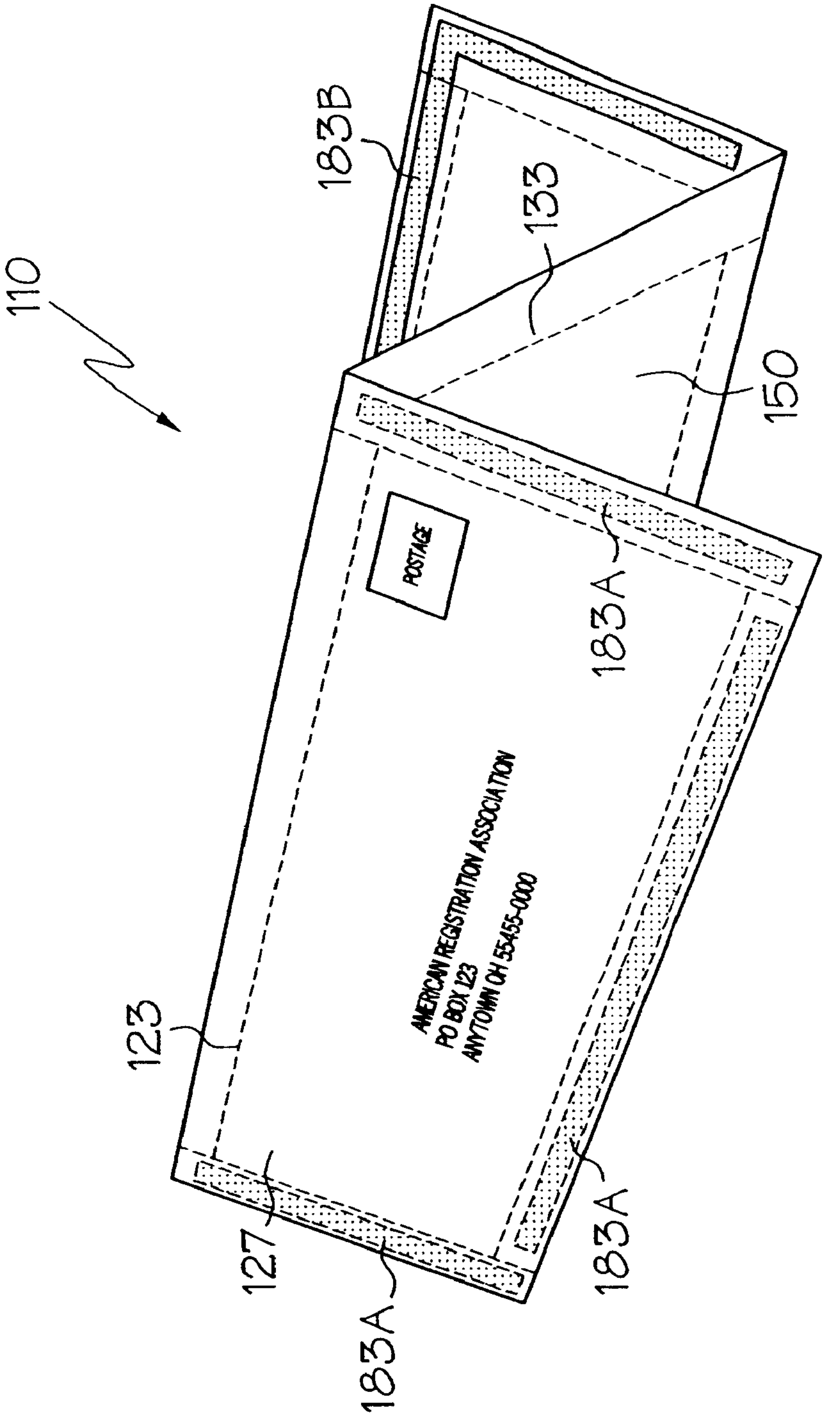
FIG. 11 is a perspective view of the sampling kit form of FIGS. 9 and 10, showing a manner in which it may be folded in use.

Referring now to FIGS. 9–11, while sheet 10 is preferably a cut sheet product, designed for use in cut sheet printers such as laser printers and ink jet printers, an alternative can include a series of such sheets connected in a continuous web, such as those used in a Z-fold configuration. In either cut sheet or Z-fold configuration, the sample kit form of the present invention is of substantially uniform thickness throughout, as there are no areas of a thickness in excess of that provided by the two plies and accompanying adhesive and release coat layers, nor does it include layers that would present edges that could become caught on paper transporting components. Consequently, the sample kit form can be printed using any of a variety of conventional printers, including laser printers and ink jet printers, whether cut-sheet or continuous. The present embodiment is similar to the first embodiment in all respects except that it is intended to be used as a Z-fold mailer intermediate in which the post card 127 portion of the sheet 110 remains attached throughout its use as a mailer. To secure the sampling kit sheet 110 in a Z-fold mailer configuration, as illustrated with particularity in FIG. 11, adhesive strip 183A is provided on the lower outer surface of the second ply 150, shown in FIG. 10, while adhesive strip 183B is provided on the upper outer surface of the first ply 120, shown in FIG. 9. In addition, U-shaped die cuts 122A in second ply 150 (shown in FIG. 10) and 122B in first ply 120 (shown in FIG. 9) cover the adhesive strips 183A, 183B during the printing operation and during the collection of the genetic sample (not shown). As with the previous embodiments, die cut 121 of the first ply 120 defines an inset portion 121A that covers adhesive and release coating portions (not presently shown). Die cuts 122A and 122B define removable liner pieces 193A and 193B that can be peeled off to expose adhesive strips 183A and 183B. When the sampling kit sheet 110 is to be folded into a Z-fold configuration as shown in FIG. 11, the removable liner pieces 193A and 193B, which carry silicone release coatings to facilitate their separation, are removed from their respective plies 150 and 120, exposing the adhesive strips 183A, 183B. The sampling kit sheet 110 of FIGS. 9–11 includes additional perforation lines, all of which are generally designated 123. These perforation lines 123 collectively define marginal tear strips 133 that extend around most or all of the periphery of sheet 110. When the sampling kit sheet 110 is received by an analyzing laboratory, it is opened by tearing along perforation lines 123 and removing all of the tear strips 133.

Having described the invention in detail and by reference to preferred embodiments thereof, it will be apparent that modifications and variations are possible without departing from the scope of the invention defined in the appended claims.

We claim:

1. A sampling kit form for organic material, said sampling kit form comprising a sheet configured to accept printed indicia thereon, said sheet including:

a first ply defined by:

a first ply outer surface;

a first ply inner surface; and a die cut defining a removable inset portion;

a second ply stackably coupled to said first ply such that corresponding edges of said first and second plies are substantially aligned, said second ply defined by:

a second ply outer surface; and a second ply inner surface facing said first ply inner surface such that, upon removal of said inset portion, at least a portion of said second ply inner surface is exposed to accept said organic material thereon;

an adhesive disposed between at least a portion of said first and second ply inner surfaces, at least a portion of said adhesive configured to be exposed upon removal of said inset portion;

a release coating disposed between at least a portion of said first and second ply inner surfaces; and at least one fold line disposed between opposing edges of said sheet such that, upon placement of said organic material on at least a portion of said adhesive, said sheet can be folded along said at least one fold line to protect said organic material within said folded sheet.

2. A sampling kit form according to claim 1, further comprising a die cut defining at least one removable liner piece on said first ply that exposes adhesive disposed underneath upon removal of said at least one liner piece.

3. A sampling kit form according to claim 1, further comprising a die cut defining at least one removable liner piece on said second ply that exposes adhesive disposed underneath upon removal of said at least one liner piece.

4. A sampling kit form according to claim 1, wherein said first ply, said second ply, said adhesive and said release coating are disposed relative to one another such that a stacking surface defined by said sheet is substantially free of undulation.

5. A sampling kit form according to claim 4, wherein the thickness of said sheet is such that printed indicia can be placed on at least one surface thereof by a conventional cut-sheet desktop printer.

6. A sampling kit form according to claim 1, further comprising:

a line of weakness disposed between opposing edges of said sheet; and a detachable postcard connected to said sheet along said line of weakness.

7. A sampling kit form for organic material, said sampling kit form comprising a substantially rectangular sheet defining opposing planar surfaces, said sheet including:

a first ply defined by:

a first ply outer surface configured to accept printed indicia thereon;

a first ply inner surface; and a die cut substantially circumscribing a removable inset portion therein; and a second ply coextensively laminated to said first ply inner surface such that the thickness of said sheet along said surfaces is substantially uniform across a significant portion thereof, said second ply defined by:

a second ply outer surface configured to accept printed indicia thereon; and a second ply inner surface having an adhesive coating portion disposed thereon such that, upon removal of said inset portion from said die cut, said organic material may be adhered to said second ply;

at least one fold line disposed between opposing edges of said sheet;

a line of weakness disposed between opposing edges of said sheet; and a detachable postcard connected to said sheet along said line of weakness.

8. A sampling kit form according to claim 7, wherein said organic material is hair.

9. A sampling kit form according to claim 7, wherein roots of said hair do not contact any of said adhesive.

10. A sampling kit according to claim 9, wherein said second ply inner surface further comprises a release coating portion disposed across at least one of said fold lines from said adhesive coating portion such that, upon adhesion of said hair onto said adhesive coating portion and subsequent folding of said sheet along said at least one fold line, said hair is securely contained between said release coating portion and said adhesive coating portion.

11. A sampling kit according to claim 10, wherein said sheet is configured to be folded along additional fold lines such that said sheet can fit into a storage container with at least one dimension smaller than that of said sheet in an unfolded configuration.

12. A sampling kit form according to claim 7, wherein said sheet is folded along at least first, second and third fold lines such that said organic material is protected within said folded sheet.

13. A sampling kit form according to claim 7, wherein said printed indicia is instructional information.

14. A sampling kit form according to claim 7, wherein an adhesive coating portion and a release coating portion are disposed between at least a portion of said first and second ply inner surfaces, said adhesive coating portion and said release coating portion in removable adhesive contact with one another to facilitate removal of said inset portion.

15. A sampling kit form according to claim 7, wherein at least a portion of said first and second plies are permanently bonded to one another.

16. A sampling kit form according to claim 15, wherein said permanent bond between said at least a portion of said first and second plies extends substantially around the entire periphery of said sheet.

17. A sampling kit form according to claim 7, further comprising a die cut defining at least one removable liner piece on said first ply that exposes adhesive disposed underneath upon removal of said at least one liner piece.

18. A sampling kit form according to claim 7, further comprising a die cut defining at least one removable liner piece on said second ply that exposes adhesive disposed underneath upon removal of said at least one liner piece.

19. A sampling kit form for hair samples, said sampling kit form comprising a substantially rectangular sheet defining opposing planar surfaces, said sheet including:

at least one fold line disposed between opposing lateral edges of said sheet;

a first ply defined by:

a first ply outer surface configured to accept printed indicia thereon;

a first ply inner surface having a release coating portion; and a die cut substantially circumscribing a removable inset portion therein; and a second ply coextensively laminated to said first ply, said second ply defined by:

a second ply outer surface configured to accept printed indicia thereon;

a second ply inner surface having:

an adhesive coating portion disposed thereon such that, upon removal of said inset portion from said die cut, said hair sample may be adhered to said second ply; and a release coating portion disposed thereon, said release coating portion situated across at least one of said at least one fold line from said adhesive coating portion such that, upon adhesion of said hair onto said adhesive coating portion and subsequent folding of said sheet along said at least one fold line, said hair is securely contained within said sheet between said adhesive coating portion and said release coating portion;

a line of weakness disposed between said opposing lateral edges of said sheet; and a detachable postcard connected to said sheet along said line of weakness, where said first ply with said release coating portion and said second ply with said adhesive coating portion are disposed relative to one another such that a stacking surface defined by said outer surface of said first ply is substantially free of undulation.

20. A sampling kit form according to claim 1, wherein said sheet is part of a continuous roll.

21. A sampling kit according to claim 1, wherein said sheet is substantially uniform in thickness throughout a significant portion of said first and second plies such that a stack formed by a plurality of said sheets does not lean.

22. A sampling kit according to claim 1, wherein said sheet comprises printed instructional information on at least one of said surfaces.

* * * * *

UNITED STATES PATENT AND TRADEMARK OFFICE

CERTIFICATE OF CORRECTION

PATENT NO. : 6,713,142 B1
DATED : March 30, 2004
INVENTOR(S) : Arway et al.

It is certified that error appears in the above-identified patent and that said Letters Patent is hereby corrected as shown below:

Column 3,
Line 1, “preventing.” should read -- preventing --

Signed and Sealed this

Fourteenth Day of September, 2004

JON W. DUDAS
*Director of the United States Patent and Trademark Office*